United States Patent [19]

Kajiwara

[11] Patent Number: 5,909,290
[45] Date of Patent: Jun. 1, 1999

[54] ORIGINAL-READING DEVICE

[75] Inventor: Norio Kajiwara, Ichikawa, Japan

[73] Assignee: Canon Kabushiki Kaisha, Tokyo, Japan

[21] Appl. No.: 08/674,791

[22] Filed: Jul. 3, 1996

[30] Foreign Application Priority Data

Jul. 11, 1995 [JP] Japan ................................. 7-198227
Jul. 28, 1995 [JP] Japan ................................. 7-211326

[51] Int. Cl.⁶ ........................................................ H04N 1/04
[52] U.S. Cl. ............................ 358/488; 358/498; 399/371
[58] Field of Search .................................... 358/474, 496, 358/498, 486, 488; 399/367, 370, 371, 373, 374; H04N 1/04

[56] References Cited

U.S. PATENT DOCUMENTS

| 4,409,674 | 10/1983 | Kingsley | 358/474 |
| 4,429,333 | 1/1984 | Davis et al. | 358/474 |
| 4,743,974 | 5/1988 | Lockwood | 358/474 |
| 5,001,566 | 3/1991 | Coli et al. | 358/474 |
| 5,444,554 | 8/1995 | Muramatsu et al. | 358/488 |
| 5,687,010 | 11/1997 | Van Tilborg et al. | 358/488 |

FOREIGN PATENT DOCUMENTS 63-046867  2/1988  Japan .

*Primary Examiner*—Kim Yen Vu
*Attorney, Agent, or Firm*—Fitzpatrick, Cella, Harper & Scinto

[57] ABSTRACT

An original-reading device has a first mode of reading an original mounted on an original-mount while moving a scanning unit for scanning the original, and a second reading mode of reading an original being moved while stopping the scanning unit at a predetermined position. The size of the device can be reduced by making the position where the scanning unit stops in the second reading mode within the moving range of the scanning unit in the first reading mode.

3 Claims, 5 Drawing Sheets

1

ORIGINAL-READING DEVICE

BACKGROUND OF THE INVENTION

1. Field of the Invention

This invention relates to an image reading device which is applied to a copier, a facsimile apparatus or the like.

2. Description of the Related Art

A conventional image reading device of this kind is described, for example, in Japanese Patent Laid-Open Application (Kokai) No. 63-046867 (1988).

The device includes a platen having a first original-reading region on which a first original, such as a thick original or the like, is to be mounted, and original-feeding means for feeding a second original, such as a sheet original or the like, to a second original-reading region provided at a predetermined position on the platen.

When reading the first original, the original is mounted on the first original-reading region, and scanning for reading the image of the original is performed by moving a reading optical system. On the other hand, when reading the second original, scanning for reading the image of the original is performed by fixing the reading optical system and feeding the second original to the second original-reading region by the original-feeding means.

In this conventional approach, the second original-reading region is provided outside the first original-reading region, and the first original-reading region and the second original-reading region are separated making a ruler member for positioning the first original a border (see FIGS. 10 and 11).

Since the second original-reading region is provided outside the first orginal-reading region, the size and the cost of the image reading device increase.

SUMMARY OF THE INVENTION

The present invention has been made in consideration of the above-described problems.

It is an object of the present invention to provide an original reading device having a compact configuration though it has the function of reading an original being moved.

According to one aspect, the present invention which achieves the above-described object relates to an original reading device comprising a transparent original-mount, scanning means for scanning an original, and conveying means for conveying an original to the original-mount. The device has a first reading mode of reading an original fixed on the original-mount while moving the scanning means, and a second reading mode of reading an original being moved by the conveying means while stopping the scanning means at a predetermined position. The position where the scanning means stops in the second reading mode is within the moving range of the scanning means in the first reading mode.

The foregoing and other objects, advantages and features of the present invention will become more apparent from the following description of the detailed description of the preferred embodiment taken in conjuction with the accompanying drawings.

DETAILED DESCRIPTION OF THE PREFERRED EMBODIMENT

A preferred embodiment of the present invention will now be described with reference to the drawings.

Figure 1:
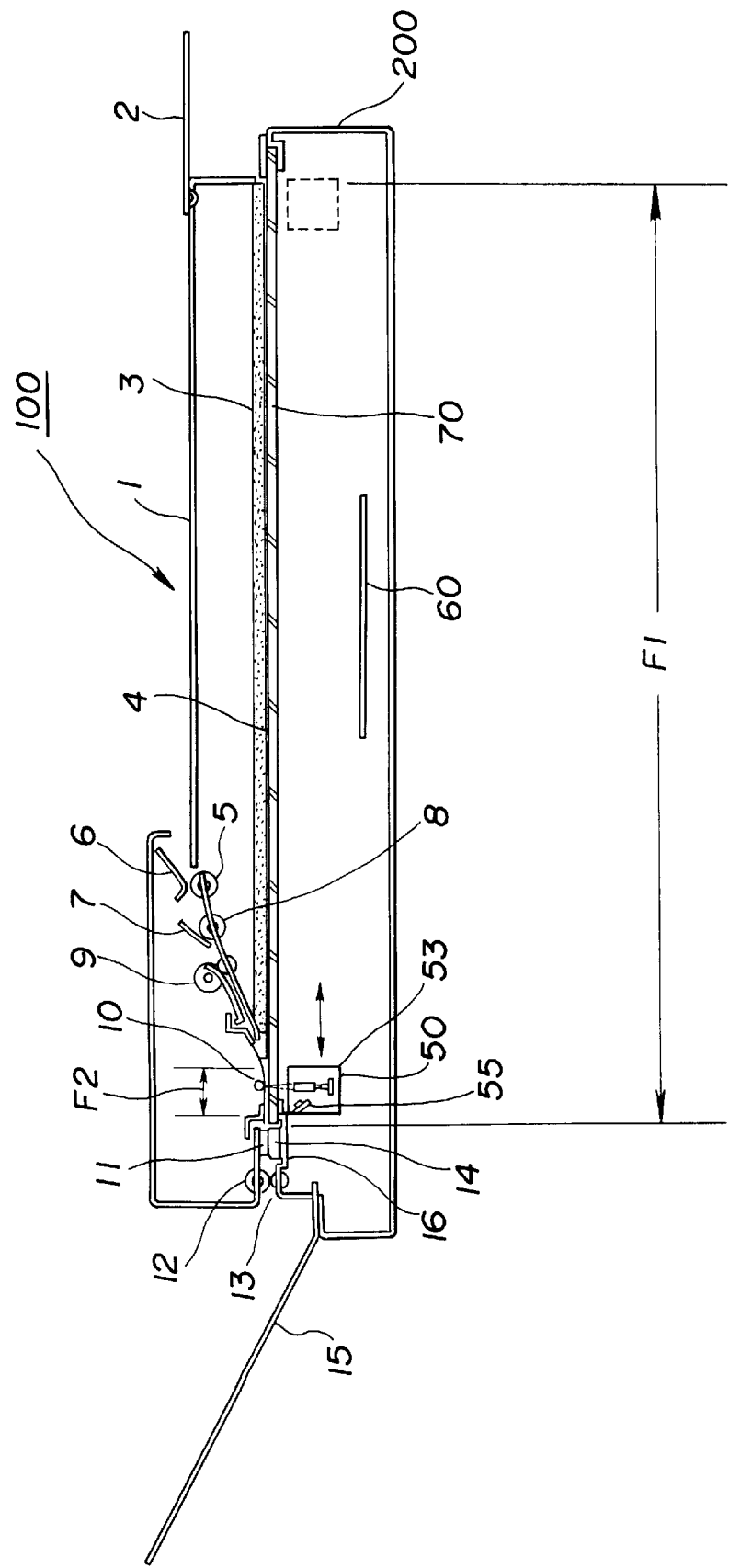
FIG. 1 is a schematic diagram illustrating the configuration of an image reading device according to an embodiment of the present invention.

FIG. 1 illustrates an image reading device according to the preferred embodiment.

The image reading device includes the main body 200 of the device having a contact glass 70, serving as a platen having a first original-reading region F1 on which a thick original, serving as a first original, is to be mounted, and an automatic original-feeder 100, serving as original-feeding means for feeding a sheet original, serving as a second original, to a second original-reading region F2 provided at a predetermined position on the contact glass 70.

The first original-reading region F1 covers substantially the entire surface of the contact glass 70. A ruler member (reference member) 14 for positioning a thick original or the like is provided at an end portion of the contact glass 70.

A contact sensor 50, serving as a reading optical system capable of reading a thick original or a sheet original on the contact glass 70, is provided below the contact glass 70.

The contact sensor (scanning means) 50 scans and reads a thick original by being moved in a horizontal direction in FIG. 1 by a moving means (not shown), i.e., a first reading mode.

The second original-reading region F2 is provided overlapped with the first original-reading region F1 at an end portion of the contact glass 70. In a second reading mode, the contact sensor 50 is fixed at a position under the second original-reading region F2, and the image of a sheet original is scanned and read while feeding the sheet original to the second original-reading region F2 by the automatic original-feeder 100.

The automatic original-feeder 100 functions as a pressing plate for pressing the upper surface of the contact glass 70, and is openable/closable around a rear portion.

The automatic original-feeder 100 includes a sheet-original mount 1 for mounting sheet originals or the like, a preliminary conveying roller 5 and a pressing plate 6 for preliminarily conveying the sheet originals, a separation piece 7 and a separation roller 8 for individually separating the sheet originals, a pair of preconveying rollers 9 for feeding the separated sheet original at a predetermined speed, a white ground 10 for the reading of the sheet original, a postconveying roller 12 for feeding the sheet original at the predetermined speed in cooperation with a conveying roller 13 disposed at the reading device, a pressing elastic material 3 and a pressing white ground 4 for pressing a thick original.

The white ground 10 for reading the sheet original constitutes a second background member covering the second original-reading region F2, and the pressing white ground 4 constitutes a first background member covering other region than the second original-reading region F2 within the first original-reading region F1.

The sheet original fed from the sheet-original mount 1 passes through the pair of preconveying rollers 9, and an adjacent portion β present at the border between the white ground 10 for the reading of the sheet original and the pressing white ground 4 (the two grounds may contact each other), and is fed to the second original-reading region F2.

Reference numeral 60 represents a controller for performing control so that the automatic original-feeder 100 and the like perform predetermined operations.

Figure 2:
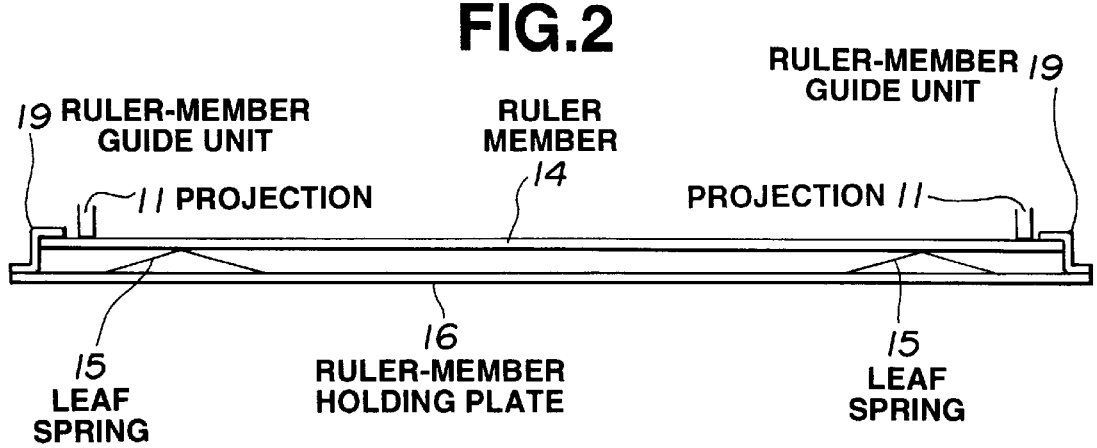
FIG. 2 is a side view of the surrounding structure of a ruler member.
Figure 3:
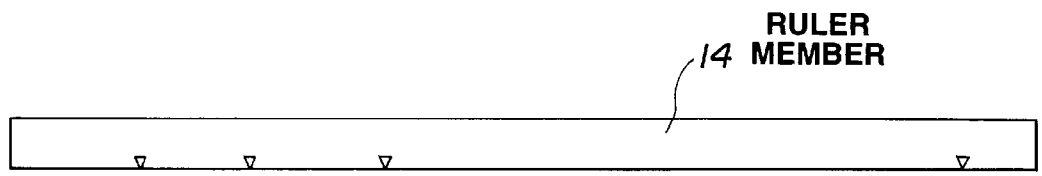
FIG. 3 is a top plan view of the ruler member.
Figure 4:
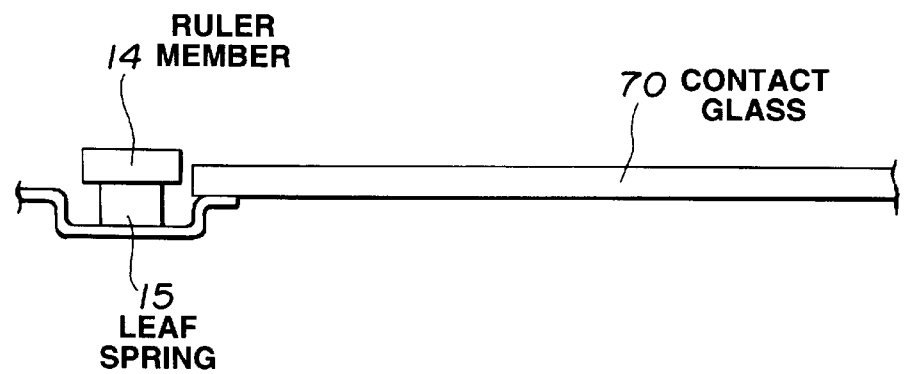
FIG. 4 is a diagram illustrating the state of the ruler member when an ADF (automatic document feeder) pressing plate separates.

As shown in FIG. 3, sizes are indicated in the ruler member 14. As shown in FIGS. 2 and 4, the ruler member 14 is urged upward by leaf springs 15. When the automatic original-feeder 100 is in a state of capable of passing the sheet original as shown in FIG. 1 (the second reading mode), the ruler member 14 is depressed to a state shown in FIG. 5 by projections 11, which serve as a part of the frame and which are disposed outside the sheet-passing region in the longitudinal direction of the ruler member 14, to allow the sheet original to pass therethrough.

Figure 5:
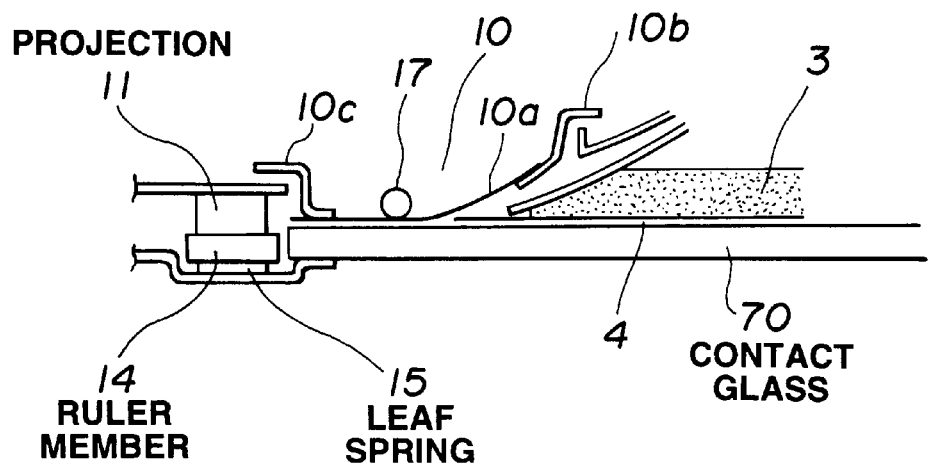
FIG. 5 is an enlarged view (when the ADF pressing plate is in pressure contact) of the surrounding structure of a sheet-original reading position.

FIG. 5 illustrates the surrounding structure of the sheet-original reading region. The white ground 10 for the reading of the sheet original comprises a white sheet 10*a* made of a resin film, such as a polyester film or the like, and stoppers 10*b* and 10*c* bonded thereto, and is configured so as to be in slight pressure contact with the contact glass 70 by the function of a weight 17.

Figure 6:
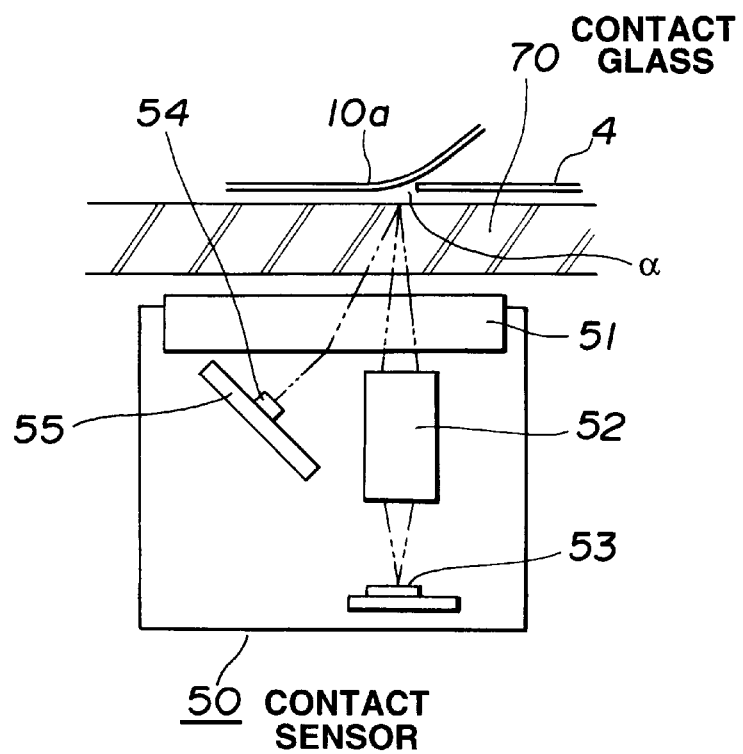
FIG. 6 is a detailed view of reading means.

As shown in FIG. 6, the contact sensor 50 has such a configuration that image light reflected from the original illuminated by a light source L, such as an LED (light-emitting diode) array or the like, disposed on a substrate 55 is condensed by a rod lens 52 and is focused on a reading device 53, such as a CCD (charge-coupled device) or the like.

Since the depth of focus of the contast sensor 50 is realatively short, it is desirable that the pressing white ground 4 and the white ground 10 for the reading of the sheet original are in tight contact with the contact glass 70. The pressing white ground 4 is relatively strongly pressed by the pressing elastic material 3, and the white ground 10 for the reading of the sheet original is pressed by the weight 17 with a strength so as to allow the sheet original to pass therethrough.

On the other hand, when the automatic original-feeder 100 is opened (the first reading mode), the ruler member 14 is raised by the leaf springs 15 so as to protrude above the contact glass 70, as shown in FIG. 4 or 1. Hence, the original can be set by contacting the ruler member 14, and therefore exact positioning can be performed.

When the automatic original-feeder 100 is closed as shown in FIG. 1, the ruler member 14 is depressed by the projections 11 to allow the original mounted on the sheet-original mount 1 to pass therethrough. Thus, it is possible to dispose the second original-reading region F2 for a sheet original or the like within the first original-reading region F1, and to minimize the length of the contact sensor 50 in the moving direction.

As shown in FIGS. 1 and 6, the present embodiment has such a configuration that a sheet original is illuminated from the downstream side in the original's moving direction.

It is thereby possible to obtain an excellent image without reading unnecessary lines even when reading a small-size thick original.

Figure 7:
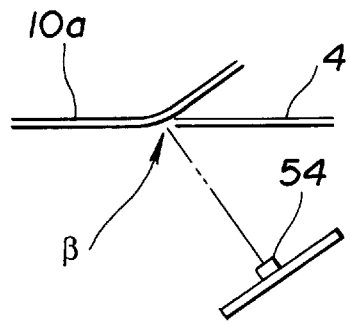
FIG. 7 is a diagram when illumination is inversed.
Figure 8:
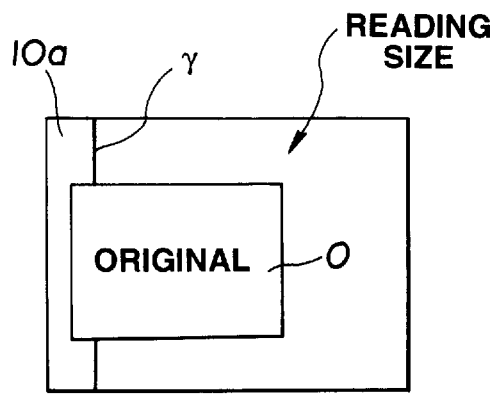
FIG. 8 is a diagram illustrating an image to be read in the state of FIG. 7.
Figure 9:
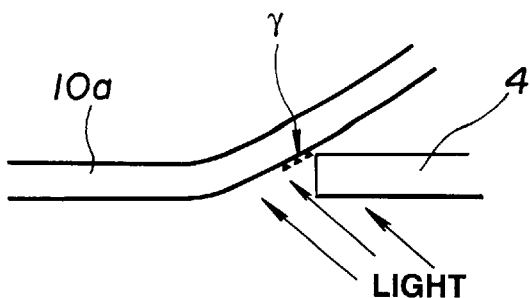
FIG. 9 is a partially enlarged view of FIG. 7.
Figure 10:
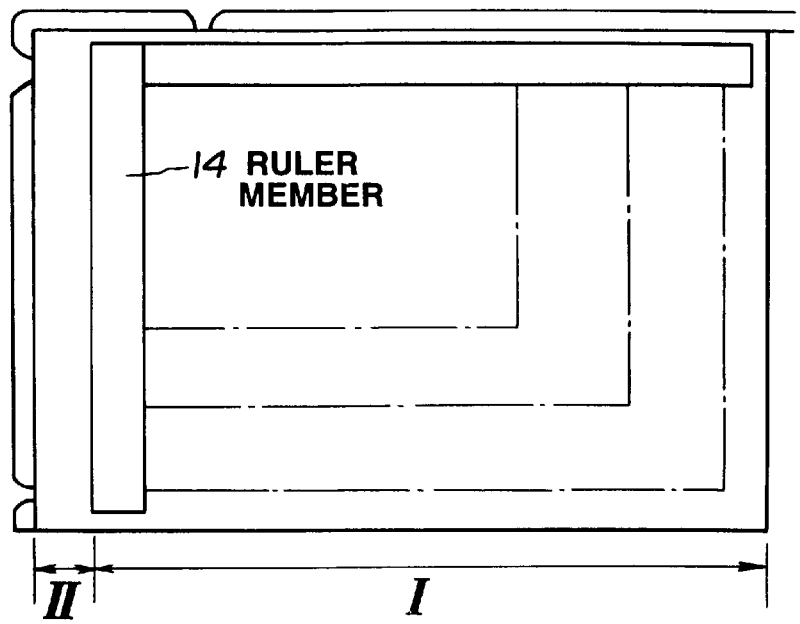
FIG. 10 is a diagram illustrating the surface of a platen of a conventional image reading device.
Figure 11:
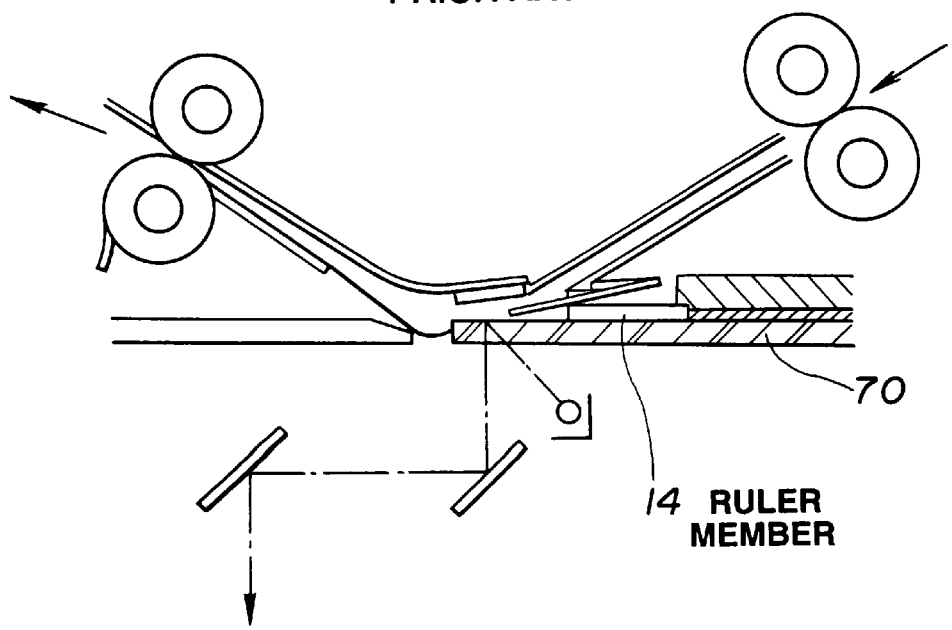
FIG. 11 is a diagram illustrating the surrounding structure of a sheet-original reading position of the conventional image reading device.

That is, as shown in FIG. 7, if an LED array 54 is disposed at the side of the pressing white ground 4 (the side of entrance of the sheet original), illuminating light is projected as shown in FIG. 9. Accordingly, an end portion of the pressing white ground 4 produces a shaded portion γ. Hence, as shown in FIG. 8, when an original O does not cover the entire region of the reading size, the shaded portion γ is read at other portions than the original O. This provides an unwanted and poor quality image.

The reading optical system may also be configured, for example, by a reduction optical system using a lens and a mirrors.

The individual components shown in outline in the drawings are all well known in the original-reading device arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompas all such modifications and equivalent structures and functions.

What is claimed is:

1. An original reading device comprising:

a transparent original-mount;

conveying means for conveying an original to said original-mount;

scanning means for scanning an original, said scanning means having a light source, which illuminates the original, moving along said original-mount in a first reading mode of scanning the original fixed on said original-mount, and stopping at a predetermined position in a second reading mode of the moving original by said conveying means, wherein a predetermined position that said light source illuminates in the second reading mode is in the illuminated area in the first reading mode; and a reference member protruding from an upper surface of said original-mount and serving as a reference when mounting an original at a predetermined position on said original-mount, wherein said reference member descends to a position lower than the upper surface of said original-mount in the second reading mode.

2. An original-reading device according to claim 1, wherein said scanning means includes a light source which illuminates the original from a position that is downstream from the conveying direction of the original.

3. An original-reading device according to claim 1, further comprising a pivotally mounted automatic original-feeder, wherein when said original-feeder is in a closed position, said reference member descends to the position lower than the upper surface of said original-mount.

\* \* \* \* \*

UNITED STATES PATENT AND TRADEMARK OFFICE
CERTIFICATE OF CORRECTION

PATENT NO. : 5,909,290
DATED : June 1, 1999
INVENTOR(S) : Norio KAJIWARA

It is certified that error appears in the above-identified patent and that said Letters Patent is hereby corrected as shown below:

ON THE COVER:

At [56] U.S. PATENT DOCUMENTS:

"4,409,674" should read --4,409,624--.

COLUMN 3:

Line 22, "of" (first occurrence) should be deleted.

COLUMN 4:

Line 18, "mirrors." should read --mirror.--.
Line 32, "encompas" should read --encompass--.

Signed and Sealed this

Seventeenth Day of April, 2001

Attest:

NICHOLAS P. GODICI

Attesting Officer    Acting Director of the United States Patent and Trademark Office